(12) United States Patent
Zhang et al.

(10) Patent No.: US 9,974,061 B2
(45) Date of Patent: May 15, 2018

(54) METHOD, UE AND BASE STATION FOR TRANSMITTING PERIODIC SIGNAL/PERIODIC SYSTEM INFORMATION, AND METHOD AND BASE STATION FOR FORWARDING PERIODIC SYSTEM INFORMATION

(71) Applicant: Telefonaktiebolaget L M Ericsson (publ), Stockholm (SE)

(72) Inventors: Haochuan Zhang, Beijing (CN); Rui Fan, Beijing (CN); Shaohua Li, Beijing (CN); Qianxi Lu, Beijing (CN); Xinghua Song, Beijing (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 242 days.

(21) Appl. No.: 14/783,631

(22) PCT Filed: Apr. 18, 2013

(86) PCT No.: PCT/CN2013/074357
§ 371 (c)(1),
(2) Date: Oct. 9, 2015

(87) PCT Pub. No.: WO2014/169459
PCT Pub. Date: Oct. 23, 2014

(65) Prior Publication Data
US 2016/0088609 A1    Mar. 24, 2016

(51) Int. Cl.
*H04W 72/04* (2009.01)
*H04W 72/12* (2009.01)
(Continued)

(52) U.S. Cl.
CPC ....... *H04W 72/0413* (2013.01); *H04L 5/0094* (2013.01); *H04W 72/04* (2013.01);
(Continued)

(58) Field of Classification Search
CPC ................................. H04W 72/0413
See application file for complete search history.

(56) References Cited

U.S. PATENT DOCUMENTS 9,590,791 B2 *   3/2017   Damnjanovic ..... H04W 52/146
9,673,952 B2 *   6/2017   Chen ................. H04L 5/0053
(Continued)

FOREIGN PATENT DOCUMENTS

WO    WO 2012/130014 A1    10/2012

OTHER PUBLICATIONS

EPO Extended European Search Report for Application No./Patent No. 13882071.7-1857 / 2987355 PCT/CN2013074357—Nov. 7, 2016.
(Continued)

*Primary Examiner* — Min Jung
*Assistant Examiner* — Toan Nguyen
(74) *Attorney, Agent, or Firm* — Sage Patent Group (57) ABSTRACT

The present disclosure relates to a method used in a UE for transmitting a periodic signal to a first base station and an associated UE. The UE has been in communications with a first base station. The method includes: obtaining from the second base station a subframe configuration, which indicates a first set of subframes assigned to communications between the UE and the first base station and a second set of subframes assigned to communications between the UE and the second base station; and if a given uplink subframe, in which the periodic signal is to be transmitted to the first base station, is not in the first set of subframes, transmitting the periodic signal in a first available uplink subframe in the first set of subframes following the given uplink subframe. The present disclosure also relates to a method used in a first base station for transmitting a periodic signal/its periodic system information to a UE and an associated first base station; and
(Continued)

a method used in a second base station for forwarding to a UE and an associated second base station.

18 Claims, 9 Drawing Sheets

(51) Int. Cl.
    *H04W 74/00*     (2009.01)
    *H04W 88/02*     (2009.01)
    *H04L 5/00*     (2006.01)
    *H04W 84/04*     (2009.01)

(52) U.S. Cl.
    CPC ..... *H04W 72/042* (2013.01); *H04W 72/1289* (2013.01); *H04W 74/004* (2013.01); *H04L 5/001* (2013.01); *H04W 76/15* (2018.02); *H04W 84/045* (2013.01); *H04W 88/02* (2013.01)

(56) References Cited

U.S. PATENT DOCUMENTS

| | | | | |
|---|---|---|---|---|
| 2011/0255484 | A1* | 10/2011 | Zhang | H04L 5/001 370/329 |
| 2012/0093040 | A1 | 4/2012 | Wu et al. | |
| 2013/0272187 | A1* | 10/2013 | Malladi | H04L 5/001 370/315 |
| 2013/0301490 | A1* | 11/2013 | He | H04W 76/048 370/280 |
| 2014/0010131 | A1* | 1/2014 | Gaal | H04W 52/0229 370/311 |
| 2014/0092823 | A1* | 4/2014 | Song | H04L 1/00 370/329 |
| 2017/0026164 | A1* | 1/2017 | Damnjanovic | H04L 5/001 |

OTHER PUBLICATIONS

3GPP TSG RAN WG2 Meeting #81; St. Julian's, Malta; Source: Intel Corporation; Title: Scenarios and benefits of dual connectivity (R2-130570)—Jan. 28-Feb. 1, 2013.

3GPP TSG RAN WG1 Meeting #72bis; Chicago, USA; Source: ETRI; Title: CA extension in support of inter-site CA (R1-131142)—Apr. 15-19, 2013.

3GPP TSG RAN WG2 Meeting #81bs; Chicago, USA; Source: Intel Corporation; Title: Dual connectivity for UEs supporting one UL CC (R2-131410)—Apr. 15-19, 2013.

PCT Notification of Transmittal of the International Search Report and the Written Opinion of the International Searching Authority, or the Declaration for International application No. PCT/CN2013/074357, dated Jan. 23, 2014.

Pantech "Discussion on Small Cell Enhancement—Dual Connectivity Aspect", 3GPP TSG RAN WG2 Meeting #81, R2-130043, Feb. 1, 2013.

3GPP "Scenarios and requirements for small cell enhancements for E-UTRA and E-UTRAN (Release 12)", 3GPP TR 36.932 V12.1.0, Mar. 2013.

* cited by examiner

METHOD, UE AND BASE STATION FOR TRANSMITTING PERIODIC SIGNAL/PERIODIC SYSTEM INFORMATION, AND METHOD AND BASE STATION FOR FORWARDING PERIODIC SYSTEM INFORMATION

PRIORITY

This nonprovisional application is a U.S. National Stage Filing under 35 U.S.C. § 371 of International Patent Application Serial No. PCT/CN2013/074357, filed Apr. 18, 2013, and entitled "METHOD, UE AND BASE STATION FOR TRANSMITTING PERIODIC SIGNAL/PERIODIC SYSTEM INFORMATION, AND METHOD AND BASE STATION FOR FORWARDING PERIODIC SYSTEM INFORMATION."

TECHNICAL FIELD

The technology presented in this disclosure generally relates to radio communication networks. More particularly, the present disclosure relates to a method used in a User Equipment (UE) having been connection with a first base station for transmitting a periodic signal to a first base station, and an associated UE; a method used in a first base station for transmitting a period signal/its periodic system information to a UE having been in communications with a second base station, and an associated first base station; and a method used in a second base station for forwarding to a UE having been in communications with the second base station periodic system information of a first base station destined to the UE, and an associated second base station.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

With the evolution of Long Term Evolution (LTE) system, LTE network switches from a homogeneous network into a heterogeneous network, where Macro eNode-Bs (eNBs) have higher transmission power for coverage purpose and pico eNBs have lower transmission power for capacity purpose. As verified, the handover failure rate is increased in such a heterogeneous network. It is therefore proposed that UE is connected to both a Macro eNB and a pico eNB concurrently, which is called dual connectivity, as shown in FIG. 1.

Figure 1:
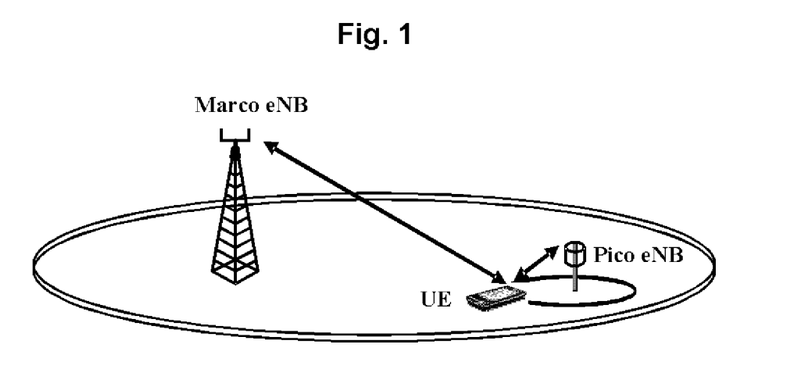
FIG. 1 is an illustration of dual connectivity.

Dual connectivity is a feature defined from the UE's perspective, where a UE may simultaneously receive from and transmit to at least two different network points as shown in FIG. 1. Dual connectivity is one of the features that are being standardized within the umbrella work of small cell enhancements within 3GPP Rel-12.

Dual connectivity is defined for the case when the aggregated network points operate on the same or separate frequency. Each network point that the UE is aggregating may define a stand-alone cell or it may not define a stand-alone cell. It is further foreseen that from the UE's perspective, the UE may apply some form of Time Division Multiplexing (TDM) scheme between the different network points that the UE is aggregating. This implies that the communication on the physical layer to and from the different aggregated network points may not be truly simultaneous.

Dual connectivity as a feature bears many similarities with carrier aggregation and Coordinated Multi Point Transmission/Reception (CoMP). The main differentiating factor is that dual connectivity is designed by considering a relaxed backhaul and less stringent requirements on synchronization requirements between the network points. This is in contrast to carrier aggregation and CoMP, where tight synchronization and a low-delay backhaul are assumed between connected network points.

Due to complicacy, some UEs support dual connectivity at Layer 2 and Layer 3. In other word, their physical layer can only connect with either Macro eNB or pico eNB at the same time slot. In order for this type of UE to work in dual connectivity scenario, subframes have to be split into two sets, subframes within one set are used for communications between UE and Macro eNB, subframes within the other set are used for communications between UE and pico eNB.

There are two different design possibilities of dual connectivity which are closely related to UE capabilities. There are different design challenges in the two design options and some tradeoff between UE complexity and system design effort is also envisioned.

For UEs capable of simultaneously transmitting to (receiving from) the dual connected nodes, there is much less constraint on system design. However, it would require UL dual carrier support in a separate carrier deployment scenario. In a same carrier deployment scenario, there will be some "dead zones" where the UE cannot hear from the two nodes simultaneously due to the large difference in dynamic range, e.g. when the UE is very close to the Pico. Moreover, there will be problems with inter-modulation products in UL when superpositioning two signals.

For UEs incapable of simultaneously transmitting (receiving) to (from) the dual connected nodes, a TDM-based dual-connectivity scheme is needed. Some semi-static resource partitioning between the two nodes is needed for continuous connection. The system design will become more complex than the previous scheme. But from the UE's perspective, the implementation complexity is reduced. For example, the UE does not need to monitor scheduling grants from the two nodes. However, the UE may need some guard time to switch connections which may reduce the spectrum efficiency.

The present disclosure will focus on the TDM-based dual-connectivity scheme. It is worth noting that TDM can be either in DownLink (DL) or in UpLink (UL), or even in both links. Furthermore, it is applicable to both TDD and FDD.

To fulfill the dual-connectivity target in a TDM manner, the subframes need to be partitioned into multiple subsets, each used for communications with one node. Such a subframe partitioning is indeed subjected to certain crucial restrictions. One example restriction is the 8 ms periodicity of the HARQ timing in FDD.

Figure 2:
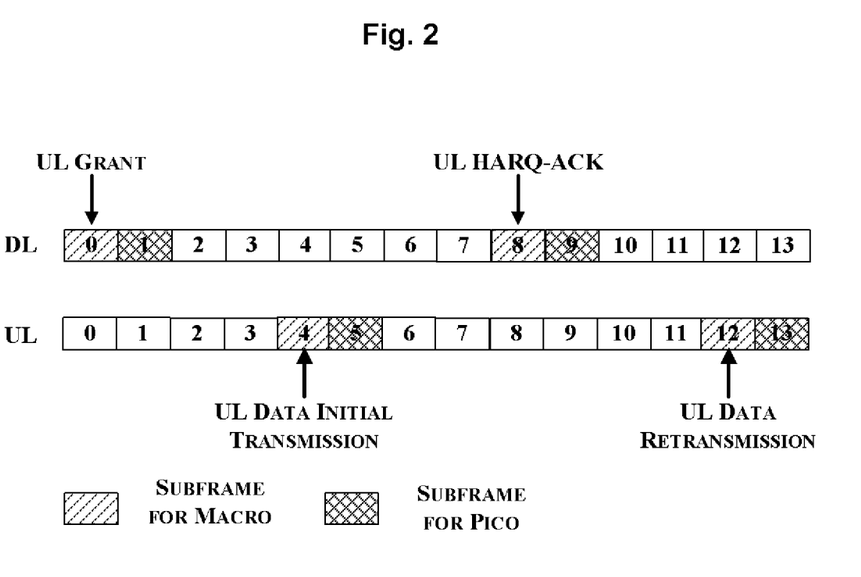
FIG. 2 illustrates scheduling and HARQ timing for UL transmission (FDD).

FIG. 2 illustrates scheduling and HARQ timing for UL transmission (FDD). As illustrated in FIG. 2, an initial UL transmission in subframe #n needs to be acknowledged in the DL in subframe #n+4, and an UL retransmission needs to be initiated in subframe #n+8, if initial transmission fails. Keeping this HARQ timing in mind, a straightforward scheme for partitioning subframes is to group subframes [#0, #8, #16, . . . ] in the DL and subframes [#4, #12,

20, . . . ] as one subframe set, and then group the remaining subframes as another subframe set:

Subframe set #0:
  DL [#0, #8, #16, . . . ] and
  UL [#4, #12, #20, . . . ]
Subframe set #1:
  DL [#1~#7, #9~#15, . . . ] and
  UL [#0~3, #5~#11, #13~#19, . . . ]

For sake of display accuracy, FIG. 2 only shows fourteen subframes. However, it will be appreciated that FIG. 2 involves subframes with higher numbers than the illustrated subframes.

Subframe set #0 can be used to communicate with the anchor node (for control-plane maintenance and small amount user-plane traffic), while subframe set #1 used by the booster carrier (for traffic offloading and huge capacity improvement).

The situation in TDD is similar, although more restrictions need to be considered in the partitioning of subframes due to various UL/DL configurations.

Consequently, feasible subframe partitioning is subjected to many restrictions, and thus, only certain patterns (e.g., periodicity) can be used to maintain dual-connectivity in a TDM manner.

SUMMARY

It is in view of the above considerations and others that the various embodiments of the present technology have been made.

According to a first aspect of the present disclosure, there is proposed a method used in a UE for transmitting a periodic signal to a first base station. The UE has been in communications with a second base station. The method includes the steps of: obtaining from the second base station a subframe configuration, which indicates a first set of subframes assigned to communications between the UE and the first base station and a second set of subframes assigned to communications between the UE and the second base station; and if a given UL subframe, in which the periodic signal is to be transmitted to the first base station, is not in the first set of subframes, transmitting the periodic signal in a first available UL subframe in the first set of subframes following the given UL subframe According to a second aspect of the present disclosure, there is proposed a method used in a first base station, for transmitting a periodic signal to a UE. The UE has been in communications with a second base station. The method includes the steps of: obtaining from the second base station a subframe configuration, which indicates a first set of subframes assigned to communications between the UE and the first base station and a second set of subframes assigned to communications between the UE and the second base station; and if a given DL subframe, in which the periodic signal is to be transmitted, is not in the first set of subframes, transmitting the periodic signal to the UE in a first available DL subframe in the first set of subframes following the given DL subframe.

According to a third aspect of the present disclosure, there is proposed a method used in a first base station, for transmitting its periodic system information to a UE. The UE has been in communications with a second base station. The method comprising the steps of: obtaining from the second base station a subframe configuration, which indicates a first set of subframes assigned to communications between the UE and the first base station and a second set of subframes assigned to communications between the UE and the second base station; and if a given DL subframe, in which the periodic system information is to be transmitted, is not in the first set of subframes but in the second set of subframes, transmitting the periodic system information to the UE via the second base station in a DL subframe of the second set of subframes.

According to a fourth aspect of the present disclosure, there is proposed a method used in a second base station, for forwarding to a UE periodic system information of a first base station destined to the UE. The UE has been in communications with the second base station. The method includes the steps of: setting a subframe configuration, which indicates a first set of subframes assigned to communications between the UE and the first base station and a second set of subframes assigned to communications between the UE and the second base station; informing the first base station and the UE of the subframe configuration; receiving from the first base station the periodic system information; and in a subframe of the second set of subframes, forwarding the periodic system information to the UE.

According to a fifth aspect of the present disclosure, there is proposed a UE for transmitting a periodic signal to a first base station. The UE has been in communications with a second base station. The UE includes an obtaining unit configured to obtain from the second base station a subframe configuration, which indicates a first set of subframes assigned to communications between the UE and the first base station and a second set of subframes assigned to communications between the UE and the second base station. The UE further includes a transmitting unit configured to, if a given UL subframe, in which the periodic signal is to be transmitted to the first base station, is not in the first set of subframes, transmit the periodic signal in a first available UL subframe in the first set of subframes following the given UL subframe.

According to a sixth aspect of the present disclosure, there is proposed a first base station for transmitting a periodic signal to a UE. The UE has been in communications with a second base station. The first base station includes an obtaining unit configured to obtain from the second base station a subframe configuration, which indicates a first set of subframes assigned to communications between the UE and the first base station and a second set of subframes assigned to communications between the UE and the second base station. The first base station further includes a transmitting unit configured to, if a given DL subframe, in which the periodic signal is to be transmitted, is not in the first set of subframes, transmit the periodic signal to the UE in a first available DL subframe in the first set of subframes following the given DL subframe.

According to a seventh aspect of the present disclosure, there is proposed a first base station for transmitting its periodic system information to a UE. The UE has been in communications with a second base station. The first base station includes an obtaining unit configured to obtain from the second base station a subframe configuration, which indicates a first set of subframes assigned to communications between the UE and the first base station and a second set of subframes assigned to communications between the UE and the second base station. The first base station further includes a transmitting unit configured to, if a given DL subframe, in which the periodic system information is to be transmitted, is not in the first set of subframes but in the second set of subframes, transmit the periodic system information to the UE via the second base station in a DL subframe of the second set of subframes.

According to a eighth aspect of the present disclosure, there is proposed a second base station for forwarding to a UE periodic system information of a first base station destined to the UE. The UE has been in communications with the second base station. The second base station includes a setting unit configured to set a subframe configuration, which indicates a first set of subframes assigned to communications between the UE and the first base station and a second set of subframes assigned to communications between the UE and the second base station. The second base station further includes an informing unit configured to inform the first base station and the UE of the subframe configuration. The second base station further includes a communicating unit configured to receive from the first base station the periodic system information, and in a subframe of the second set of subframes, forward the periodic system information to the UE.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

As used hereinafter, it should be appreciated the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC (Machine Type Communication) devices, which do not necessarily involve human interaction. Also, the term "base station" as used herein may be referred to as a radio base station, a NodeB or an evolved NodeB (eNB), access point, relay node, etcetera.

With TDM limitation in dual connectivity scenario, subframes have to be split into two different sets of subframes for a TDM UE when it is connected to both a Macro eNB and a pico eNB:
1) One set of subframes for communications between the Macro eNB and the UE;
2) The other set of subframes for communications between the pico eNB and the UE.

The Macro eNB and the pico eNB are of illustrative, and any other suitable types of eNBs may be applicable to such a subframe partitioning.

As discussed in the above, a UE operating in the TDM dual-connectivity mode is allowed only to communicate with (i.e., transmit a signal to and/or receive a signal from) one connected node in any given subframe. However, for some cases, the UE needs to communicate with more than one node in the same time slot, which will break the TDM limitation. The issue arises in the following several examples:

PBCH (in DL): PBCH is transmitted in the second slot of the first subframe within a radio frame. As the first subframe can only be allocated to one subframe set, a UE is not possible to decode in that subframe PBCHs of other connected nodes that are configured with other subframe sets. Here, assume all connected nodes to be subframe-synchronized because the TDM-based dual-connectivity prefers synchronized network for complexity reason among others.

Physical Downlink Shared Channel (PDSCH) for Secondary Information Block 1 (SIB1) (in DL): SIB1 is scheduled in the sixth subframe of each even-numbered radio frame. The same problem as PBCH exists in an attempt to decode all the channels simultaneously.

Periodic Physical Uplink Control Channel (PUCCH) (in UL): Periodic PUCCH carrying CQI (Channel Quality Indicator)/PMI (Precoding Matrix Indicator)/RI (Rank Indicator) is sent by the UE in a periodicity of 2, 5, 10, 20, 40, 80, 160, 32, 64, or 128 ms. Considering the subframe partitioning as shown in FIG. 2 and a UE connected to one node (configured with subframe set #0), then a periodic PUCCH transmission having a periodicity of 2, 5, 10, or 20 ms may occupy time slots that do not belong to the node (configured with subframe set #0).

Periodic Sounding Reference Signal (SRS) (in UL): The periodicity of SRS could be 2, 5, 10, 20, 40, 80, 160, or 320 ms. So, for a periodicity smaller than 40 ms, there exists an inconsistency between SRS and the subframe partitioning of the 8 ms periodicity as shown in FIG. 2. As a result, the same problem as PUCCH will occur.

Semi-Persistent Scheduling (SPS) (in UL/DL): The periodicity of SPS in both the UL and DL could be 10, 20, 32, 40, 64, 80, 128, 160, 320, and 640 ms (although the UL and DL are independently configured). Again, SPS of a 10 ms or 20 ms periodicity will become problematic for the subframe portioning using the 8 ms periodicity as shown in FIG. 2.

By definition, a UE operating in the TDM-based dual-connectivity mode can only communicate with one network node (at most) in a given time slot. In practice, however, it is difficult to implement TDM by simply letting the UE follow the Rel-11 behavior/procedure. One example is that the periodic transmission/reception would break the TDM limitation, i.e., simultaneous communication with multiple nodes might be required in certain time slots. Although careful scheduling can avoid some of these cases, limitations (like HARQ timing) on the partitioning of the TDM subframe set make only little/no room left for the scheduling solution. In certain cases, it is even impossible to keep the TDM limitation.

For cases where the TDM limitation of communicating with only one connected node in each time slot can be kept (e.g., via careful scheduling), the UE can simply follow the Rel-11 procedure to handle the periodic transmission and reception.

For cases where the TDM limitation cannot be kept by the UE simply following the Rel-11 behavior, new procedures need to be defined for both the network node and the UE so that simultaneous communication with multiple connected nodes in a given time slot could be avoided. The present disclosure is made in view of this.

Specifically, the present disclosure proposes two new methods to handle the issue:
One is for the UE or the connected node to delay the periodic transmission to the latest valid subframe in the subframe set of interest so that simultaneous communication with other nodes can be avoided (in strict sense, the delayed transmission is no longer periodic, and it could be termed "quasi-periodic".)
The other is for one connected node to forward the information for all others so that the UE only needs to communicate with a single node in a specific time slot.

Hereunder, the present disclosure will be explained in details by way of the following example schemes:
PBCH
Assume that a subframe for PBCH is allocated to a set of subframes for communications between a UE and node #k, then the UE should only decode PBCH for node #k. That is, the UE may only obtain Master Information Blocks (MIBs) of node #k.
In accordance with the present disclosure, node #k will forward MIBs of all other connected nodes to the UE (e.g., via dedicated signaling).
PDSCH for SIB1
Similar to PBCH, assume that a subframe for PDSCH for SIB1 is allocated to a set of subframes for communications between a UE and node #k, then the UE should only decode PDSCH for node #k, thereby only obtaining SIB1 for node #k.
In accordance with the present disclosure, node #k will forward SIB1 of all other connected nodes to the UE (e.g., via dedicated signaling).
Periodic PUCCH
If a subframe computed from Rel-11 for transmission of a periodic PUCCH is not in the subframe set of the desired connected node, in accordance with the present disclosure, the transmission will be delayed to the latest valid subframe available in the subframe set of interest. Here, the "subframe set of interest" refers to the subframe set that is used for communications between the target connected node and the UE. Moreover, the "valid subframe" refers to a subframe that can be used for the transmission of periodic PUCCH. DL subframes and special subframes, for instance, are invalid in this sense, although they might also belong to the subframe set of interest.
Periodic SRS
Similar to periodic PUCCH, if a subframe computed from Rel-11 for transmission of a periodic SRS is not in the subframe set of interest, the present disclosure delays the transmission to the latest valid subframe available in the subframe set of interest.
Here, the "valid subframe" refers to a subframe that is available for SRS transmission within the entire cell range.
As well known, which subframes are available for SRS transmission should be broadcasted to all UEs within the cell, or the PUSCH transmission of some UEs will collide with the SRS. For this reason, although the TDM subframe set is independently configured for each UE, delaying the SRS transmission should take into account both the desired subframe set of the UE and the available SRS subframes within the target cell.
SPS
Similar to PUCCH and SRS, in accordance with the present disclosure, SPS transmission may be delayed to the latest valid subframe in the subframe set for the target connected node, if a subframe computed from Rel-11 for transmission of SPS is not in the subframe set of interest.

With the proposed schemes, the present disclosure may avoid simultaneous communication with multiple nodes in a given subframe.

Hereunder, some embodiments will be explained in details by referring to FIGS. 3-6 on how to address the above issues.

Figure 3:
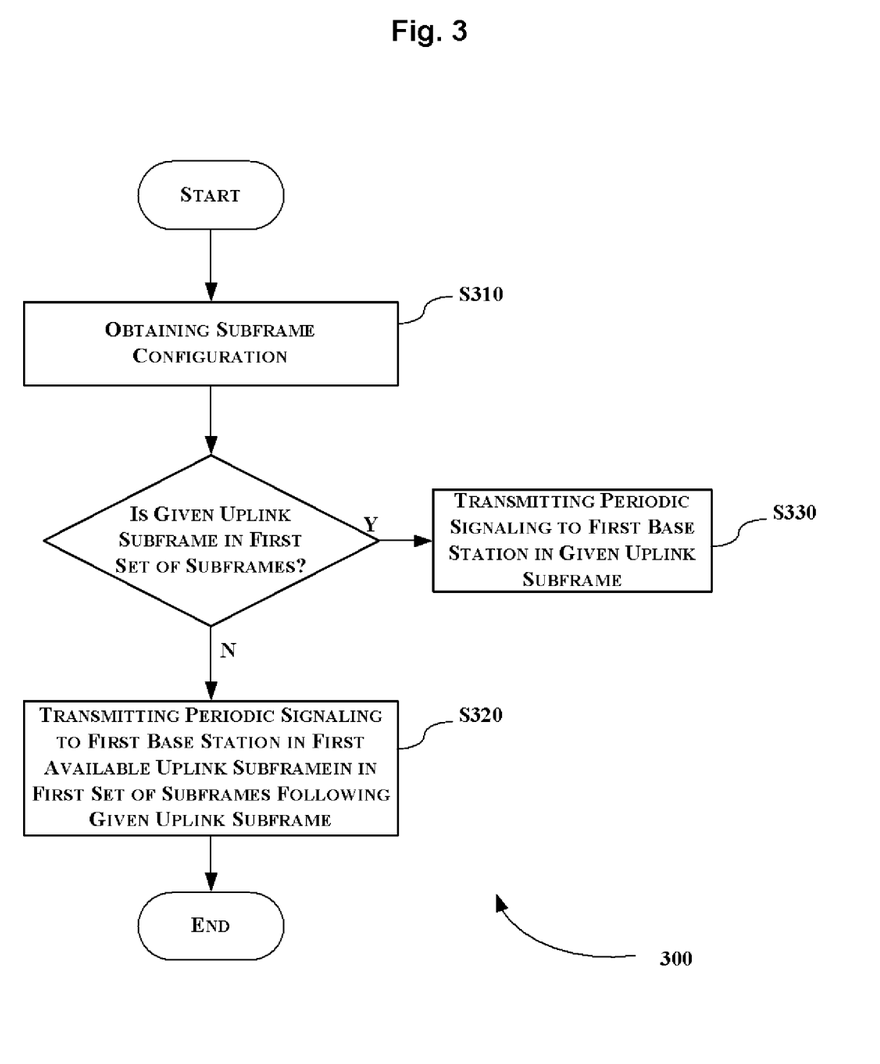
FIG. 3 is a flowchart of a method used in a UE for transmitting a periodic signal to a first base station according to a first embodiment of the present disclosure.

FIG. 3 shows a flowchart of a method 300 used in a UE for transmitting a periodic signal to a first base station according to a first embodiment of the present disclosure. The UE here has been in communications with a second base station. That is, the UE is a TDM UE.

As shown in FIG. 3, at step S310, the UE obtains a subframe configuration from the second base station. The subframe configuration indicates a first set of subframes assigned to communications between the UE and the first base station and a second set of subframes assigned to communications between the UE and the second base station.

At step S320, if a given UL subframe, in which the periodic signal is to be transmitted to the first base station, is not in the first set of subframes, the UE transmits the periodic signal in a first available UL subframe in the first set of subframes following the given UL subframe.

The method 300 optionally includes a step S330.

At step S330, if the given UL subframe is in the first set of subframes, the UE transmits the periodic signal to the first base station in the given UL subframe.

Alternatively, the periodic signal may include one of:
a periodic channel state reporting using PUCCH;
a periodic SRS; or
a periodic uplink transmission scheduled via SPS.

Hereunder, an example for a periodic channel state (e.g., CSI) reporting using PUCCH will be explained in details by assuming the subframe configuration of FIG. 2. In this example, assume that a periodicity of the periodic channel state reporting is 5 ms.

As shown in FIG. 2, the set of subframes for communications between a UE and a Macro eNB and the set of subframes for communications between the UE and a pico eNB are subframe set #0 and subframe set #1 as follows:

Subframe set #0:
DL [#0, #8, #16, . . . ] and
UL [#4, #12, #20, . . . ]
Subframe set #1:
DL [#1~#7, #9~#15, . . . ] and
UL [#0~#3, #5~#11, #13~#19, . . . ]

Such a subframe partitioning is of illustrative, and any other partitioning may be applicable to the present disclosure. Moreover, the Macro eNB and the pico eNB may be replaced with other suitable nodes.

Example 1—CSI Reporting Using PUCCH

When the UE transmits a CSI to the Macro eNB in subframe 4, a next CSI will be transmitted to the Macro eNB in subframe 12, instead of subframe 9 computed from Rel-11 based on the periodicity of 5 ms.

Although this example is presented here with reference to CSI, it will be equally applicable to PMI, RI and the like.

In accordance with the first embodiment, the present disclosure may delay the periodic transmission (e.g., a periodic channel state reporting using PUCCH, SRS and periodic UL transmission scheduled via SPS) to the latest valid subframe available in the subframe set of interest, thereby avoiding inconsistency between periodic transmission/reception and the subframe partitioning scheme.

Figure 4:
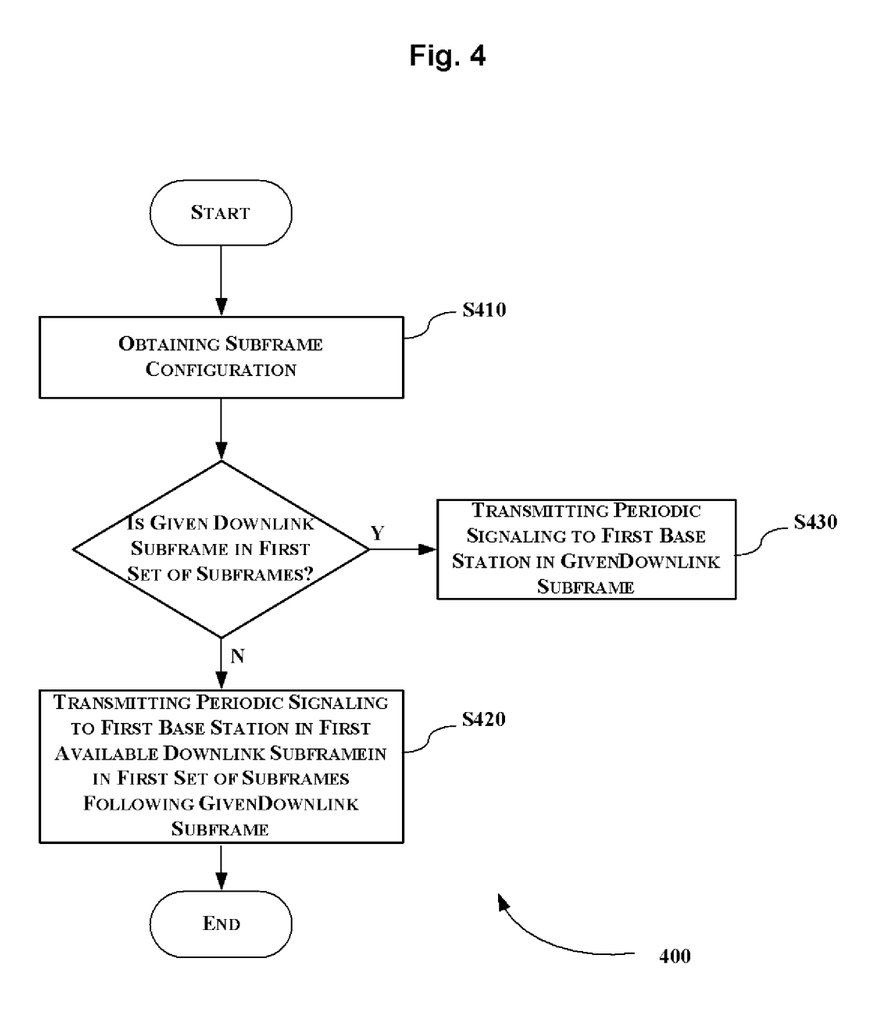
FIG. 4 is a flowchart of a method used in a first base station, for transmitting a periodic signal to a UE according to a second embodiment of the present disclosure.

FIG. 4 shows a flowchart of a method 400 used in a first base station, for transmitting a periodic signal to a UE according to a second embodiment of the present disclosure. The UE here has been in communications with a second base station. That is, the UE is a TDM UE.

As shown in FIG. 4, at step S410, the first base station obtains a subframe configuration from the second base station. The subframe configuration indicates a first set of subframes assigned to communications between the UE and the first base station and a second set of subframes assigned to communications between the UE and the second base station.

At step S420, if a given DL subframe, in which the periodic signal is to be transmitted to the UE, is not in the first set of subframes, the first base station transmits the periodic signal to the UE in a first available DL subframe in the first set of subframes following the given DL subframe.

The method 400 optionally includes a step S430.

At step S430, if the given DL subframe is in the first set of subframes, the first base station transmits the periodic signal to the UE in the given DL subframe.

Alternatively, the periodic signal includes a periodic DL transmission scheduled via SPS.

Hereunder, an example for a periodic DL transmission scheduled via SPS will be explained in details by assuming the subframe configuration of FIG. 2. In this example, assume that a periodicity of the periodic DL transmission scheduled via SPS is 10 ms.

As shown in FIG. 2, the set of subframes for communications between a UE and a Macro eNB and the set of subframes for communications between the UE and a pico eNB are subframe set #0 and subframe set #1 as follows:

Subframe set #0:
DL [#0, #8, #16, . . . ] and
UL [#4, #12, #20, . . . ]
Subframe set #1:
DL [#1~#7, #9~#15, . . . ] and
UL [#0~#3, #5~#11, #13~#19, . . . ]

Such a subframe partitioning is of illustrative, and any other partitioning may be applicable to the present disclosure. Moreover, the Macro eNB and the pico eNB may be replaced with other suitable nodes.

Example 2—A Periodic DL Transmission Scheduled Via SPS

If the Macro eNB transmits the periodic DL transmission scheduled via SPS to the UE in subframe 0, a next CSI will be transmitted to the Macro eNB in subframe 16 (not shown in FIG. 2 for display accuracy), instead of subframe 11 computed from Rel-11 based on the periodicity of 10 ms.

In accordance with the second embodiment, the present disclosure may delay the periodic transmission (e.g., a periodic DL transmission scheduled via SPS) to the latest valid subframe available in the subframe set of interest, thereby avoiding inconsistency between periodic transmission/reception and subframe partitioning schemes.

Figure 5:
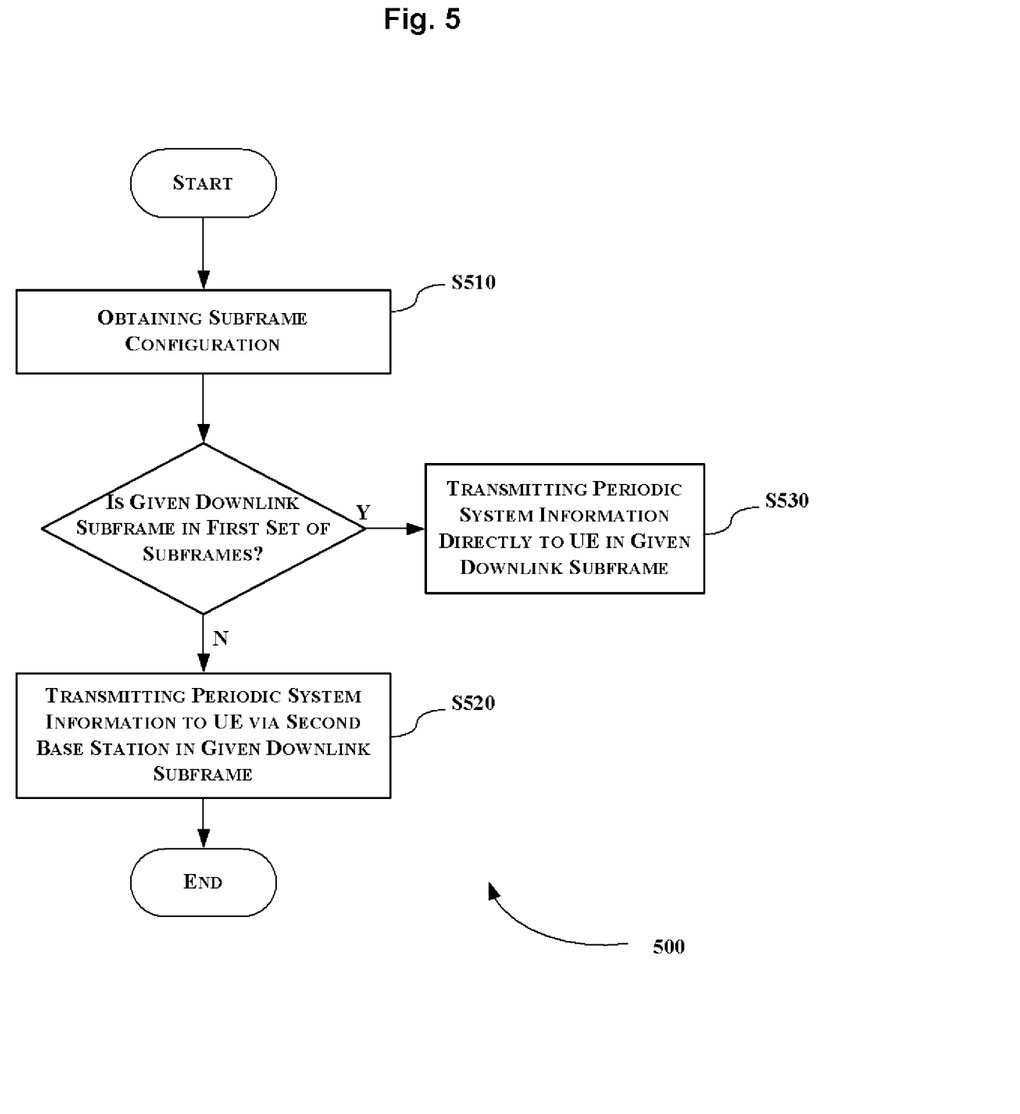
FIG. 5 is a flowchart of a method used in a first base station for transmitting its periodic system information to a UE according to a third embodiment of the present disclosure.

FIG. 5 shows a flowchart of a method 500 used in a first base station for transmitting its periodic system information to a UE according to a third embodiment of the present disclosure. The UE here has been in communications with a second base station. That is, the UE is a TDM UE.

As shown in FIG. 5, at step S510, the first base station obtains a subframe configuration from the second base station. The subframe configuration indicates a first set of subframes assigned to communications between the UE and the first base station and a second set of subframes assigned to communications between the UE and the second base station.

At step S520, if a given DL subframe, in which the periodic system information is to be transmitted to the UE, is not in the first set of subframes but in the second set of subframes, the first base station transmits the periodic system information to the UE via the second base station in a DL subframe of the second set of subframes.

The method 500 optionally includes step S530.

At step S530, if the given DL subframe is in the first set of subframes, the first base station transmits the periodic system information directly to the UE in the given DL subframe.

Alternatively, the periodic signal may include MIB or SIB.

Figure 6:
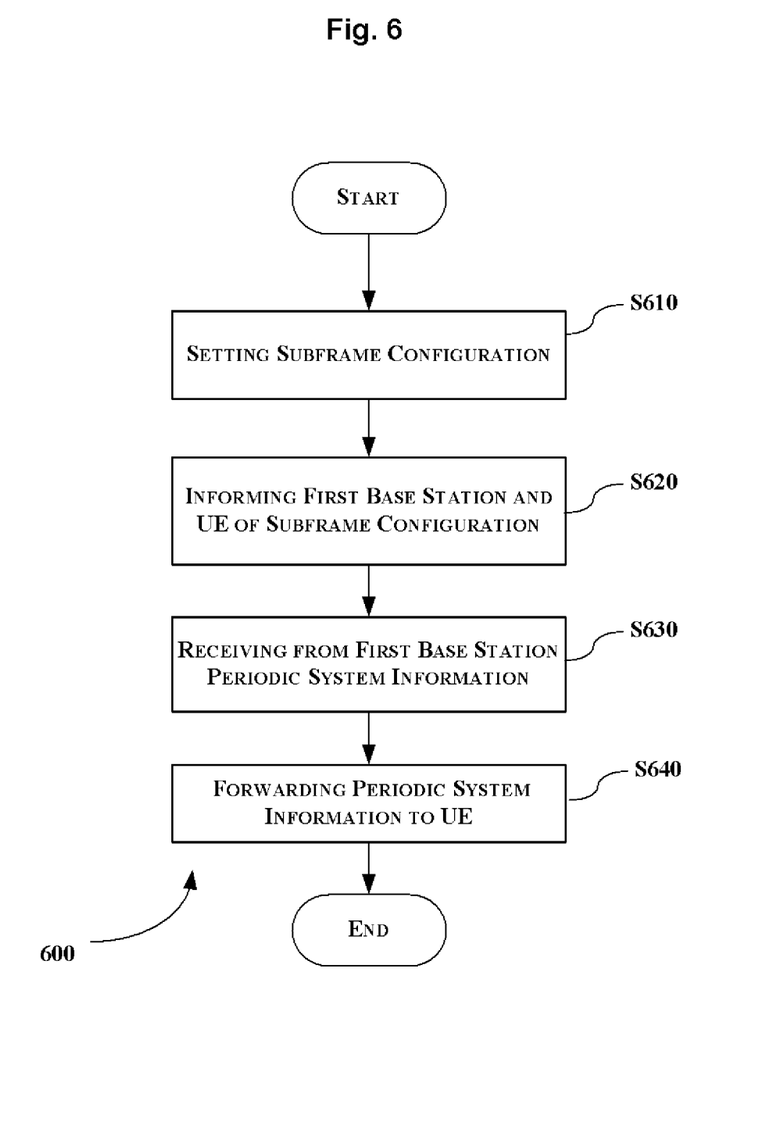
FIG. 6 is a flowchart of a method used in a second base station for forwarding to a UE periodic system information of a first base station destined to the UE according to a fourth embodiment of the present disclosure.

FIG. 6 shows a flowchart of a method 600 used in a second base station for forwarding to a UE periodic system information of a first base station destined to the UE according to a fourth embodiment of the present disclosure. The UE here has been in communications with a second base station. That is, the UE is a TDM UE.

As shown in FIG. 6, at step S610, the second base station sets a subframe configuration. The subframe configuration indicates a first set of subframes assigned to communications between the UE and the first base station and a second set of subframes assigned to communications between the UE and the second base station.

At step S620, the second base station informs the first base station and the UE of the subframe configuration.

At step S630, the second base station receives the periodic system information from the first base station.

At step S640, the second base station forwards, in a subframe of the second set of subframes, the periodic system information to the UE.

Alternatively, the periodic system information may include MIB or SIB.

In accordance with the third and fourth embodiments, if a given DL subframe for PBCH for MIBs/PDSCH for SIB1 of a connected node is assigned to a set of subframes for communications between a UE and another connected node, MIBs/SIB1 of the connected node will be forwarded by the another connected node. This may avoid inconsistency between periodic transmission/reception and the subframe partitioning scheme.

Figure 7:
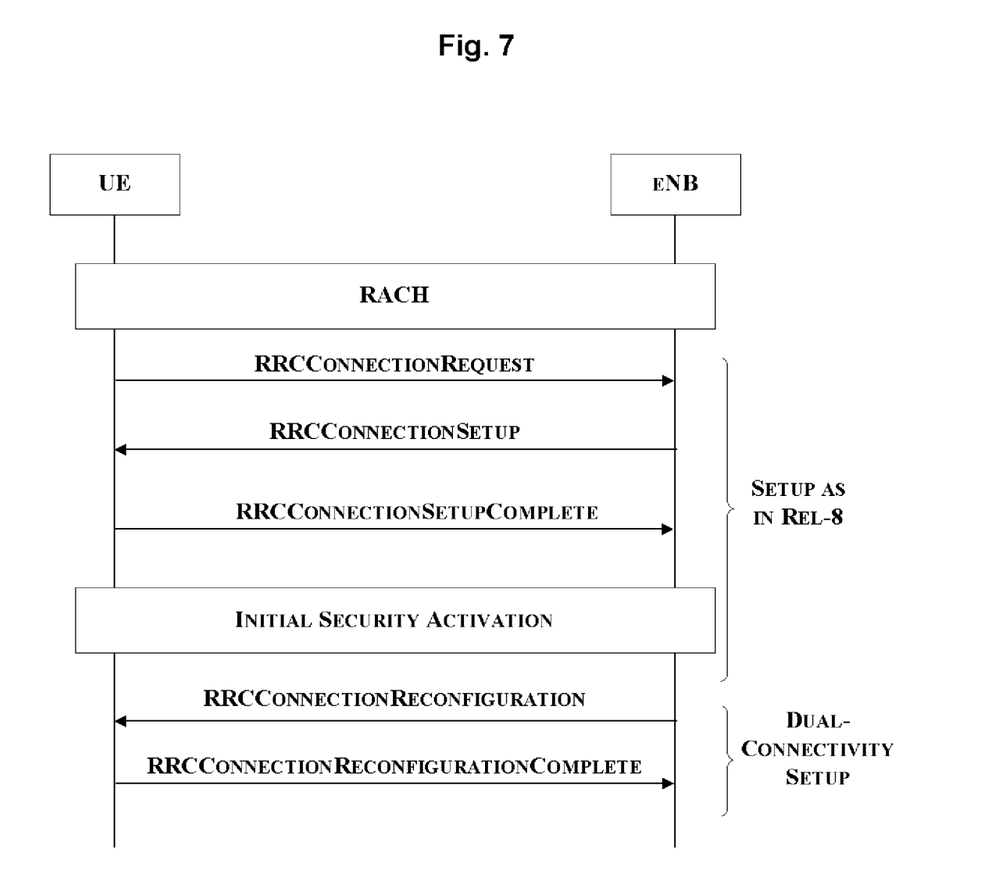
FIG. 7 shows a sequence diagram illustrating the method as illustrated in FIG. 6 in details.

FIG. 7 shows a sequence diagram illustrating the method (i.e., the forwarding scheme) as illustrated in FIG. 6 in details.

As shown in FIG. 7, the UE firstly establishes RRC connection to an eNB (e.g., a Macro eNB) by following Rel-8 Rel-11 behaviors. This is summarized as "Setup as in Rel-8" in FIG. 7.

The eNB knows that the UE wants to dual-connect to another eNB (e.g., a pico eNB), and then initiates a dual-connectivity activation, which is summarized as the "dual-connectivity setup" in FIG. 7.

The "dual-connectivity setup" generally includes two steps.

As the first step, the eNB sends (e.g., via PDSCH) RRCCONNECTIONRECONFIGURATION message to the UE, in which the another eNB's system information (system information originally contained in PBCH and SIBx-PDSCH) is conveyed. In this case, the eNB forwards the another eNB's system information to the UE.

As the second step, the UE acknowledges the reconfiguration upon safe reception by using RRCCONNECTION-RECONFIGURATIONCOMPLETE message, and starts dual-connect to the two eNBs. Then, the procedure ends.

Figure 8:
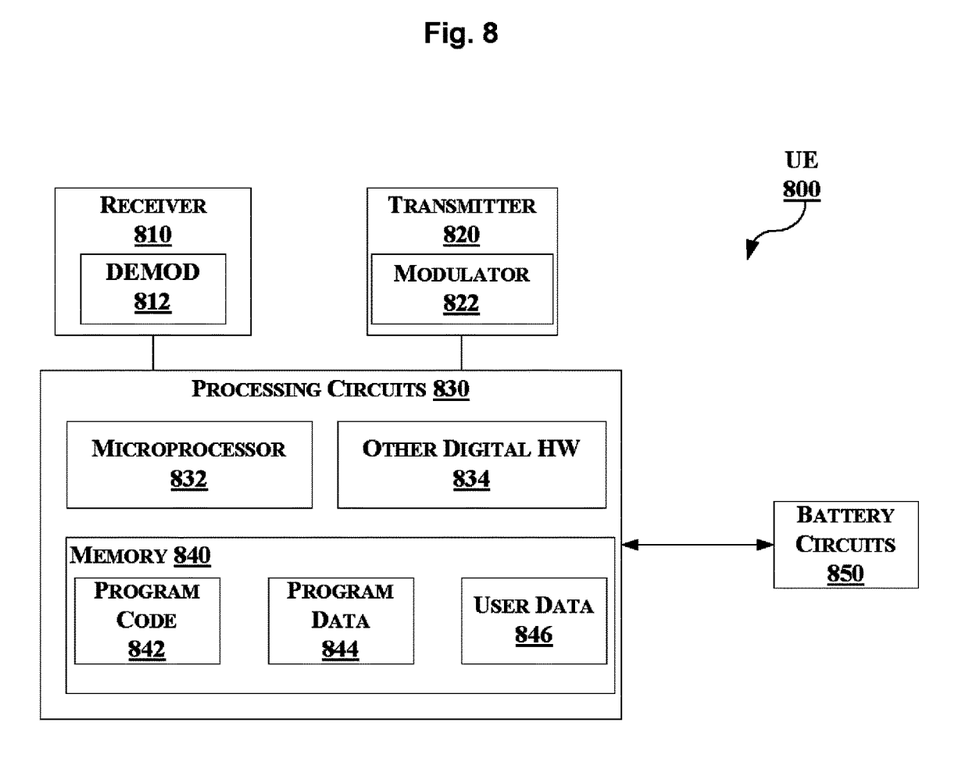
FIG. 8 is a block diagram of a UE 800 configured according to the present disclosure.

FIG. 8 is a block diagram of a UE 800 having been in communications with a second base station, for transmitting a periodic signal to a first base station according to the present disclosure. In particular, UE 800 may be configured to participate in the method illustrated in FIG. 3, or variants thereof.

As shown, the UE 800 includes a receiver circuit 810, which includes at least two antennas and various like radio-frequency components (not shown) and a demodulator 812. The receiver 810 receives radio signals received from one or more base stations and processes the signals by using known radio processing and signal processing techniques, for the processor circuits 830. The processing circuits 830 extract data from signals received via the receiver 810 and generate information for transmission to a corresponding eNB via the transmitter circuit 820. Like the receiver 810 and the demodulator 812, the transmitter 820 and the modulator 822 use known radio processing and signal processing components and techniques, typically according to a particular telecommunications standard such as LTE and LTE-A (Advanced), and are configured to format digital data and generate and condition a radio signal for transmission over the air.

The processing circuits 830 include one or several microprocessors 832, digital signal processors, and the like, as well as other digital hardware 834 and memory circuit 840. The memory 840, which includes one or several types of memory such as read-only memory (ROM), random-access memory (RAM), cache memory, flash memory devices, optical storage devices, etc., stores program code 842 for executing one or more telecommunications and/or data communications protocols and for carrying out one or more of the techniques described herein. The memory 840 further stores program data 844, user data 846 received from the base station and to be transmitted to the base station, and also stores various parameters, pre-determined threshold values, and/or other program data for controlling the operation of the UE 800. The UE 800 includes various other features that are not shown, in addition to the battery circuits 850 pictured in FIG. 8; these features, such as user interface circuitry, positioning circuits, and the like, are well known to those skilled in the art and are therefore not illustrated.

In various embodiments, processing circuits 830, using appropriate program code 842 stored in the memory 840, are configured to implement one or more of the random access techniques described herein. Of course, not all of the steps of these techniques are necessarily performed in a single microprocessor or even in a single module.

Figure 9:
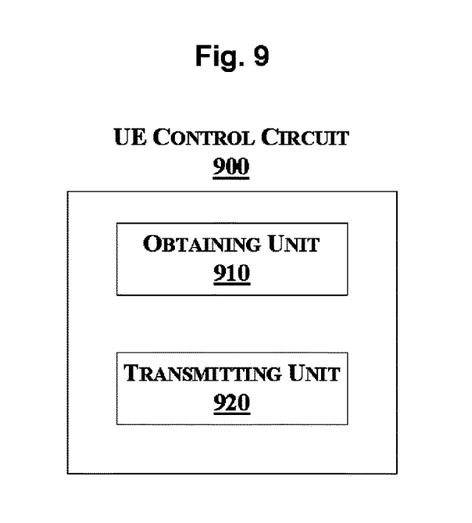
FIG. 9 illustrates a UE control circuit 900 according to the present disclosure.

Thus, FIG. 9 presents a more generalized view of a UE control circuit 900 configured to carry out the periodic signal transmission technique described herein. The UE control circuit 900 here may be also considered as a UE of the present disclosure. This UE control circuit 900 may have a physical configuration that corresponds directly to the processing circuits 830, for example, or may be embodied in two or more modules or units, like the configuration illustrated in FIG. 9, and may be implemented as hardware, software or a combination of hardware and software. In any case, however, the UE control circuit 900 is configured to implement at least two functions, which are pictured in FIG. 9 as an obtaining unit 910 and a transmitting unit 920.

The obtaining unit 910 obtains from the second base station a subframe configuration, which indicates a first set of subframes assigned to communications between the UE and the first base station and a second set of subframes assigned to communications between the UE and the second base station.

The transmitting unit 920 is configured to, if a given UL subframe, in which the periodic signal is to be transmitted to the first base station, is not in the first set of subframes, transmit the periodic signal in a first available UL subframe in the first set of subframes following the given UL subframe.

The transmitting unit 920 is further configured to: if the given UL subframe is in the first set of subframes, transmit the periodic signal to the first base station in the given UL subframe.

Alternatively, the periodic signal may include one of:
a periodic channel state reporting using PUCCH;
a periodic SRS; or
a periodic uplink transmission scheduled via SPS.

Figure 10:
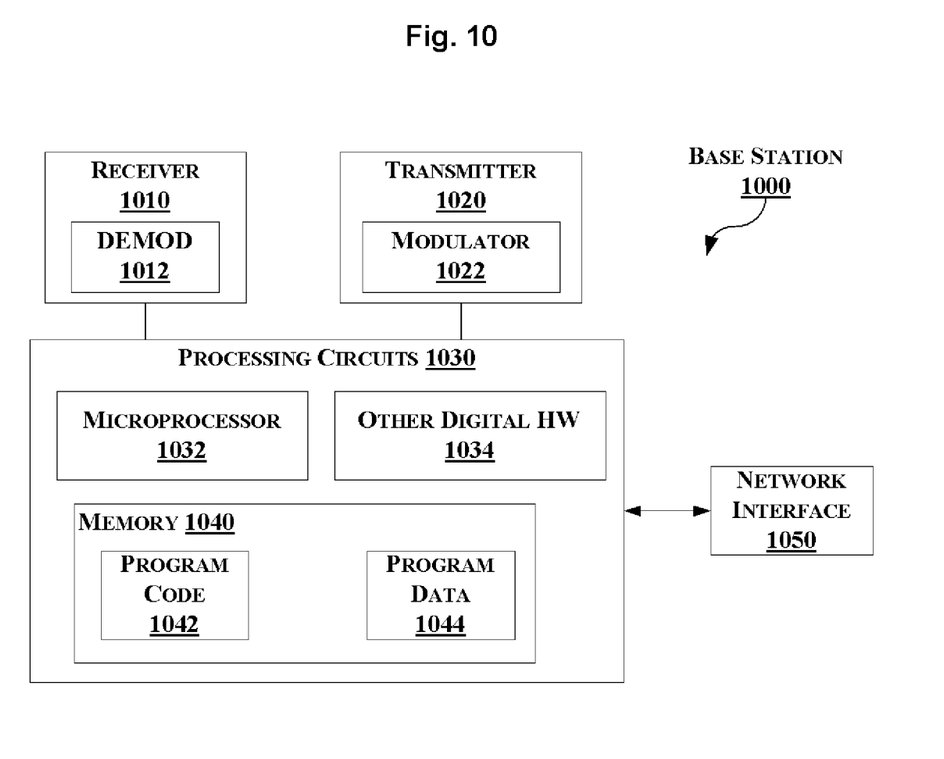
FIG. 10 is a block diagram of a base station 1000 configured according to the present disclosure.

FIG. 10 is a block diagram of a base station 1000 for transmitting a periodic signal/its periodic system information or forwarding periodic system information of another base station to a UE having been in a connection with both of the base station 1000 and the another base station. In particular, the base station 1000 may be configured to implement either method as illustrated in FIGS. 4-6, or variants thereof.

As shown, the base station 1000 includes a receiver circuit 1010, which includes at least two antennas and various other radio-frequency components (not shown) and a demodulator circuit 1012. The receiver 1010 receives radio signals received from one or more wireless base station and processes the signals by using known radio processing and signal processing techniques, to convert the received radio signals into digital samples for processor circuits 1030. More particularly, the receiver 1010 is capable of receiving a random access preamble from the UE by means of sits antennas. The processing circuits 1030 extract data from signals received via the receiver 1010 and generate information for transmission to the UE via transmitter circuit 1020. Like the receiver 1010 and the demodulator 1012, the transmitter 1020 and modulator 1022 use known radio processing and signal processing components and techniques, typically according to one or more telecommunications standards, and are configured to format digital data and generate and condition a radio signal, from that data, for transmission over the air.

The processing circuits 1030 include one or several microprocessors 1032, digital signal processors, and the like, as well as other digital hardware 1034 and memory circuit 1040. The memory 1040, which may include one or several types of memory such as read-only memory (ROM), random-access memory (RAM), cache memory, flash memory devices, optical storage devices, etc., stores program code 1042 for executing one or more telecommunications and/or data communications protocols and for carrying out one or more of the techniques for signaling certain type of information described herein. Memory 1040 further stores program data 1044 as well as buffered traffic data received from UEs and from network interface 1050, and also stores various parameters, predetermined threshold values, and/or other program data for controlling the general operation of the base station 1000.

In some embodiments, the processing circuits 1030, using appropriate program code 1042 stored in the memory 1040, are configured to implement one or more of the techniques described herein. Of course, not all of the steps of these techniques are necessarily performed in a single microprocessor or even in a single module.

Figure 11:
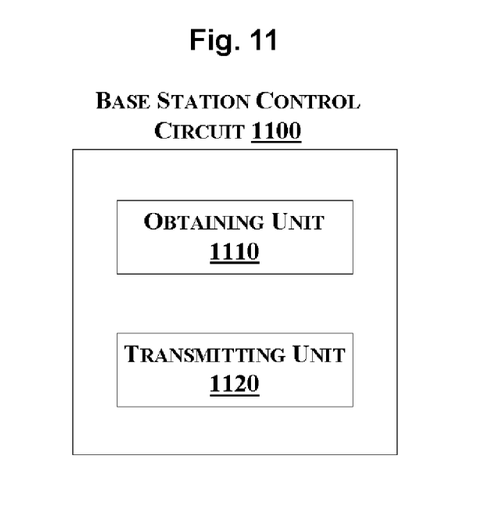
FIG. 11 illustrates a base station control circuit 1100 according to the present disclosure.

Thus, FIG. 11 presents a more generalized view of a base station control circuit 1100 operating as a first base station. The base station control circuit 1100 may be configured to implement the method as illustrated in FIG. 4. Specifically, the base station control circuit 1100 is configured to transmit a periodic signal to a UE having been in communications with a second base station according to the present disclosure. This base station control circuit 1100 may have a physical configuration that corresponds directly to the processing circuits 1030, for example, or may be embodied in two or more modules or units, like the configuration illustrated in FIG. 11, and may be implemented as hardware, software or a combination of hardware and software. In any case, however, the base station control circuit 1100 is configured to implement at least two functions, which are pictured in FIG. 11 as an obtaining unit 1110 and a transmitting unit 1120.

The obtaining unit 1110 obtains a subframe configuration from the second base station. The subframe configuration indicates a first set of subframes assigned to communications between the UE and the first base station and a second set of subframes assigned to communications between the UE and the second base station.

The transmitting unit 1120 is configured to, if a given DL subframe, in which the periodic signal is to be transmitted to the UE, is not in the first set of subframes, transmit the periodic signal to the UE in a first available DL subframe in the first set of subframes following the given DL subframe.

Optionally, the transmitting unit 1120 may be further configured to: if the given DL subframe is in the first set of subframes, transmit the periodic signal to the UE in the given DL subframe.

Alternatively, the periodic signal includes a periodic DL transmission scheduled via SPS.

Figure 12:
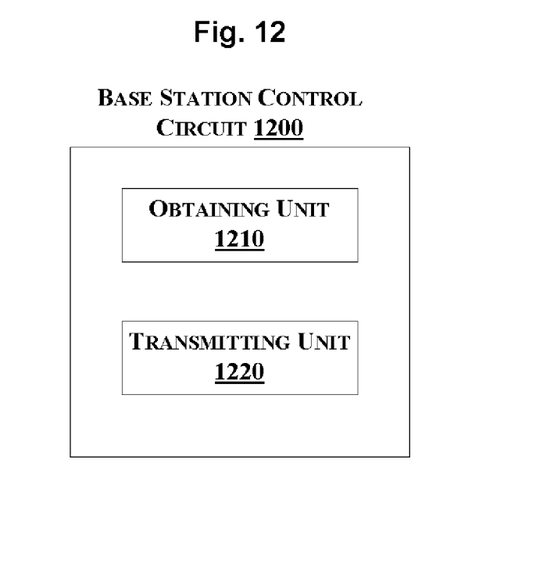
FIG. 12 illustrates a base station control circuit 1200 according to the present disclosure.

FIG. 12 presents a more generalized view of a base station control circuit 1200 operating as a first base station. The base station control circuit 1200 may be configured to implement the method as illustrated in FIG. 5. Specifically, the base station control circuit 1200 is configured to transmit periodic system information of the first base station to a UE having been in communications with a second base station. The base station control circuit 1200 here may be also considered as a base station of the present disclosure. This base station control circuit 1200 may have a physical configuration that corresponds directly to the processing circuits 1030, for example, or may be embodied in two or more modules or units, like the configuration illustrated in FIG. 12, and may be implemented as hardware, software or a combination of hardware and software. In any case, however, the base station control circuit 1200 is configured to implement at least two functions, which are pictured in FIG. 12 as an obtaining unit 1210 and a transmitting unit 1220.

The obtaining unit 1210 obtains a subframe configuration from the second base station. The subframe configuration indicates a first set of subframes assigned to communications between the UE and the first base station and a second set of subframes assigned to communications between the UE and the second base station.

The transmitting unit 1220 is configured to, if a given DL subframe, in which the periodic system information is to be transmitted to the UE, is not in the first set of subframes but in the second set of subframes, transmit the periodic system information to the UE via the second base station in a DL subframe of the second set of subframes.

Optionally, the transmitting unit 1220 may be further configured to: if the given DL subframe is in the first set of subframes, transmit the periodic system information directly to the UE in the given DL subframe.

Alternatively, the periodic system information includes MIB or SIB.

Figure 13:
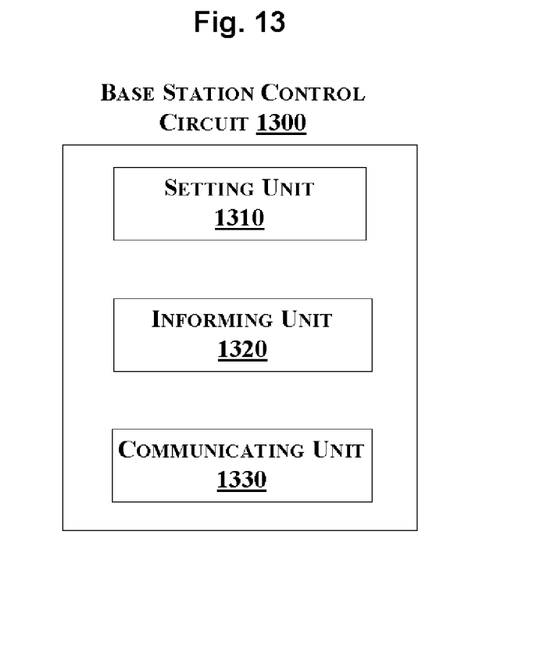
FIG. 13 illustrates a base station control circuit 1300 according to the present disclosure.

FIG. 13 presents a more generalized view of a base station control circuit 1300 operating as a second base station. The base station control circuit 1300 may be configured to implement the method as illustrated in FIG. 6. Specifically, the base station control circuit 1300 is configured to forward to a UE having been in communications with the second base station, periodic system information of a first base station destined to the UE. The base station control circuit 1300 here may be also considered as a base station of the present disclosure. This base station control circuit 1300 may have a physical configuration that corresponds directly to the processing circuits 1030, for example, or may be embodied in two or more modules or units, like the configuration illustrated in FIG. 13, and may be implemented as hardware, software or a combination of hardware and software. In any case, however, the base station control circuit 1300 is configured to implement at least three functions, which are pictured in FIG. 13 as a setting unit 1310, an informing unit 1320, and a communicating unit 1330.

The setting unit 1310 is configured to set a subframe configuration. The subframe configuration indicates a first set of subframes assigned to communications between the UE and the first base station and a second set of subframes assigned to communications between the UE and the second base station.

The informing unit 1320 is configured to inform the first base station and the UE of the subframe configuration.

The communicating unit 1330 is configured to receive the periodic system information from the first base station, and in a subframe of the second set of subframes, forward the periodic system information to the UE.

Alternatively, the periodic system information may include MIB or SIB.

It should be noted that two or more different units in this disclosure may be logically or physically combined. For example, the informing unit 1320 and the communicating unit 1330 may be combined as one single unit.

Although the present technology has been described above with reference to specific embodiments, it is not intended to be limited to the specific form set forth herein. For example, the embodiments presented herein are not limited to the existing LTE system; rather they are equally applicable to new communication standards defined in future. The technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

What is claimed is:

1. A method used in a User Equipment, UE, for transmitting a periodic signal to a first base station, the UE having been in communications with a second base station, the method comprising the steps of:
    obtaining from the second base station a subframe configuration, which indicates a first set of subframes assigned to communications between the UE and the first base station and a second set of subframes assigned to communications between the UE and the second base station; and
    if a given uplink subframe, in which the periodic signal is to be transmitted to the first base station, is not in the first set of subframes, transmitting the periodic signal in a first available uplink subframe in the first set of subframes following the given uplink subframe.

2. The method according to claim 1, further comprising:
    if the given uplink subframe is in the first set of subframes, transmitting the periodic signal to the first base station in the given uplink subframe.

3. The method according to claim 1, wherein the periodic signal includes one of:
    a periodic channel state reporting using Physical Uplink Control Channel, PUCCH;
    a periodic Sounding Reference Signal, SRS; or
    a periodic uplink transmission scheduled via Semi-Persistent Scheduling, SPS.

4. A User Equipment, UE, for transmitting a periodic signal to a first base station, the UE having been in communications with a second base station, the UE comprising a processing circuit configured to perform the method according to claim 1.

5. A method used in a first base station, for transmitting a periodic signal to a User Equipment, UE, the UE having been in communications with a second base station, the method comprising the steps of:
    obtaining from the second base station a subframe configuration, which indicates a first set of subframes assigned to communications between the UE and the first base station and a second set of subframes assigned to communications between the UE and the second base station; and
    if a given downlink subframe, in which the periodic signal is to be transmitted to the UE, is not in the first set of subframes, transmitting the periodic signal to the UE in a first available downlink subframe in the first set of subframes following the given downlink subframe.

6. The method according to claim 5, further comprising:
    if the given downlink subframe is in the first set of subframes, transmitting the periodic signal to the UE in the given downlink subframe.

7. The method according to claim 5, wherein the periodic signal includes a periodic downlink transmission scheduled via Semi-Persistent Scheduling, SPS.

8. A first base station for transmitting a periodic signal to a User Equipment, UE, the UE having been in communications with a second base station, the first base station comprising a processing circuit configured to perform the method according to claim 5.

9. A method used in a first base station, for transmitting its periodic system information to a User Equipment, UE, the UE having been in communications with a second base station, the method comprising the steps of:
    obtaining from the second base station a subframe configuration, which indicates a first set of subframes assigned to communications between the UE and the first base station and a second set of subframes assigned to communications between the UE and the second base station; and
    if a given downlink subframe, in which the periodic system information is to be transmitted to the UE, is not in the first set of subframes but in the second set of subframes, transmitting the periodic system information to the UE via the second base station in a downlink subframe of the second set of subframes.

10. The method according to claim 9, further comprising:
    if the given downlink subframe is in the first set of subframes, transmitting the periodic system information directly to the UE in the given downlink subframe.

11. The method according to claim 9, wherein the periodic system information includes:
    Master Information Block, MIB; or
    Secondary Information Block, SIB.

12. A first base station for transmitting its periodic system information to a User Equipment, UE, the UE having been in communications with a second base station, the first base station comprising a processing circuit configured to perform the method according to claim 9.

13. A User Equipment, UE, for transmitting a periodic signal to a first base station, the UE having been in communications with a second base station, the UE comprising:
    memory configured to store program code;

one or more processing circuits that, when caused to implement the program code stored in memory, is configured to:

obtain from the second base station a subframe configuration, which indicates a first set of subframes assigned to communications between the UE and the first base station and a second set of subframes assigned to communications between the UE and the second base station; and transmit the periodic signal, if a given uplink subframe, in which the periodic signal is to be transmitted to the first base station, is not in the first set of subframes, in a first available uplink subframe in the first set of subframes following the given uplink subframe.

14. The UE according to claim 13, wherein the one or more processing circuits are further configured to:

if the given uplink subframe is in the first set of subframes, transmit the periodic signal to the first base station in the given uplink subframe.

15. The UE according to claim 13, wherein the periodic signal includes one of:

a periodic channel state reporting using Physical Uplink Control Channel, PUCCH;

a periodic Sounding Reference Signal, SRS; or a periodic uplink transmission scheduled via Semi-Persistent Scheduling, SPS.

16. A first base station for transmitting a periodic signal to a User Equipment, UE, the UE having been in communications with a second base station, the first base station comprising:

memory configured to store program code;

one or more processing circuits that, when caused to implement the program code stored in memory, is configured to:

obtain from the second base station a subframe configuration, which indicates a first set of subframes assigned to communications between the UE and the first base station and a second set of subframes assigned to communications between the UE and the second base station; and transmit the periodic signal to the UE, if a given downlink subframe, in which the periodic signal is to be transmitted to the UE, is not in the first set of subframes, in a first available downlink subframe in the first set of subframes following the given downlink subframe.

17. The first base station according to claim 16, wherein the one or more processing circuits are further configured to:

if the given downlink subframe is in the first set of subframes, transmit the periodic signal to the UE in the given downlink subframe.

18. The first base station according to claim 16, wherein the periodic signal includes a periodic downlink transmission scheduled via Semi-Persistent Scheduling, SPS.

* * * * *